(12) United States Patent
Niimi et al.

(10) Patent No.: US 8,534,145 B2
(45) Date of Patent: Sep. 17, 2013

(54) ENGINE STARTING APPARATUS

(75) Inventors: Masami Niimi, Handa (JP); Mitsuhiro Murata, Niwa-gun (JP); Kiyokazu Haruno, Anjo (JP); Hiroaki Higuchi, Kariya (JP)

(73) Assignee: Denso Corporation, Kariya (JP)

( * ) Notice: Subject to any disclaimer, the term of this patent is extended or adjusted under 35 U.S.C. 154(b) by 307 days.

(21) Appl. No.: 12/766,345

(22) Filed: Apr. 23, 2010

(65) Prior Publication Data

US 2010/0269630 A1 Oct. 28, 2010

(30) Foreign Application Priority Data

Apr. 24, 2009 (JP) .................. 2009-106554

(51) Int. Cl.
*F02N 15/06* (2006.01)

(52) U.S. Cl.
USPC .................................. 74/7 R; 74/6

(58) Field of Classification Search
USPC ....................................... 74/6–7 E
See application file for complete search history.

(56) References Cited

U.S. PATENT DOCUMENTS

| 2,947,179 | A | * | 8/1960 | Lafitte | 74/6 |
| 3,798,977 | A | * | 3/1974 | Digby | 74/6 |
| 7,996,135 | B2 | | 8/2011 | Ishii et al. | |
| 2008/0162007 | A1 | | 7/2008 | Ishii et al. | |
| 2010/0282199 | A1 | | 11/2010 | Heyers et al. | |

FOREIGN PATENT DOCUMENTS

| DE | 100 59 902 A1 | 6/2002 |
| EP | 1 939 444 A2 | 7/2008 |
| EP | 2 159 410 A2 | 3/2010 |
| JP | A-08-028411 | 1/1996 |
| JP | A-11-30139 | 2/1999 |
| JP | A-2001-248710 | 9/2001 |
| JP | A-2002-70699 | 3/2002 |
| JP | A-2003-83212 | 3/2003 |
| JP | A-2005-113781 | 4/2005 |
| JP | A-2006-132343 | 5/2006 |
| JP | A-2006-161590 | 6/2006 |
| JP | A-2008-163818 | 7/2008 |
| KR | 10-2008-0098654 | 11/2008 |
| WO | WO 2007/101770 A1 | 9/2007 |
| WO | WO 2010/012764 A1 | 2/2010 |

OTHER PUBLICATIONS

European Search Report issued in Application No. 10004353.8; Dated Apr. 28, 2011.
Korean Office Action issued in Korean Application No. 10-2010-0038185 on Mar. 28, 2012 (with translation).
Jan. 29, 2013 Office Action issued in Japanese Patent Application No. 2009-106554 (with translation.

* cited by examiner

*Primary Examiner* — David M Fenstermacher
*Assistant Examiner* — Terence Boes
(74) *Attorney, Agent, or Firm* — Oliff & Berridge, PLC

(57) ABSTRACT

In an engine starting apparatus, together with a one-way clutch, a pinion is pushed toward a ring gear of an engine mounted in a vehicle. The one-way clutch has an idling torque smaller than a torque of the ring gear that tries to turn the pinion when the pinion is pushed to the ring gear. By a control device, a pinion pushing device is enabled to operate when i) the revolution speed of the ring gear is larger than a revolution speed of the pinion and ii) a relative revolution speed between the revolution speed of the ring gear and the revolution speed of the pinion is a desired value.

20 Claims, 7 Drawing Sheets

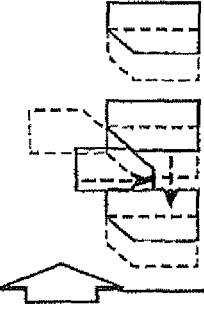

FIG. 4A

PINION MOVES FORWARD TO RING GEAR IN ROTATION

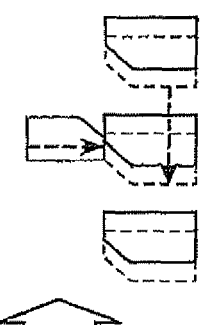

FIG. 4B

WITH PINION BEING PRESSED AGAINST RING GEAR TO PRODUCE FRICTIONAL FORCE, REVOLUTIONS OF PINION INSTANTANEOUSLY SYNCHRONIZE WITH AND CATCH UP REVOLUTIONS OF RING GEAR (CLUTCH IDLES)

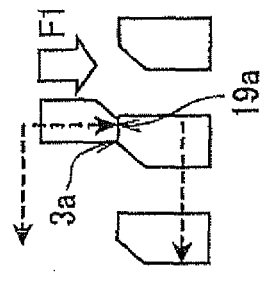

FIG. 4C

RING GEAR DECELERATES TO BRING THE RING GEAR INTO SLIDABLE CONTACT WITH PINION IN CLUTCH CONNECTING DIRECTION, CAUSING DEVIATION

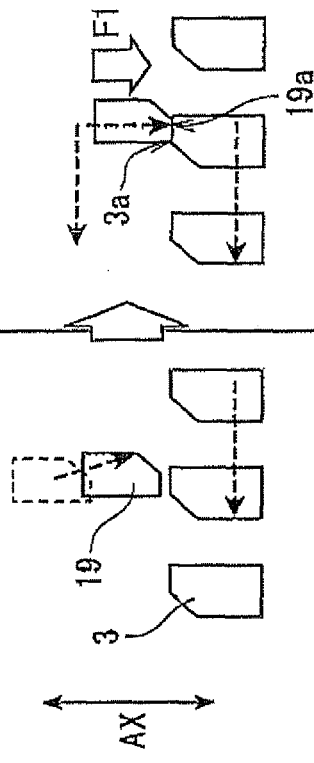

FIG. 4D

RING GEAR FURTHER DECELERATES AND ENGAGES WITH PINION

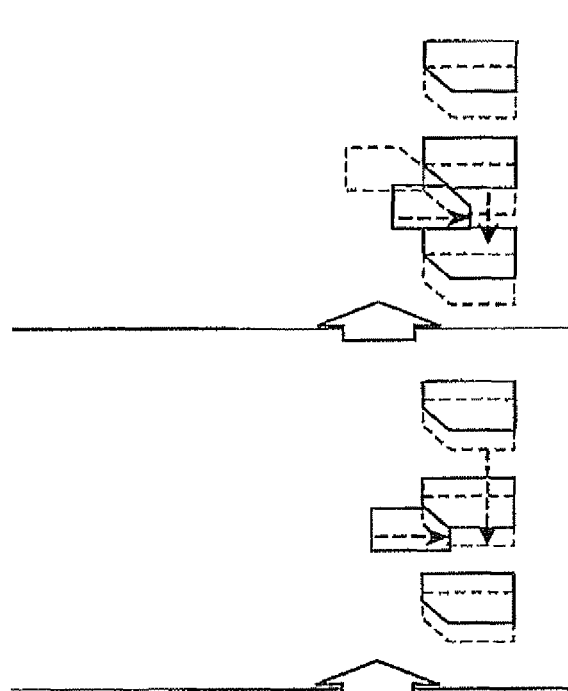
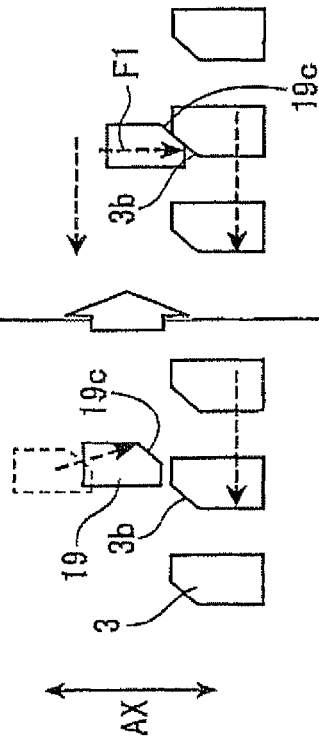

| FIG. 5A | FIG. 5B | FIG. 5C | FIG. 5D |
|---|---|---|---|
| PINION MOVES FORWARD TO RING GEAR IN ROTATION | WITH CHAMFERED PORTION OF PINION CATCHING CHAMFERED PORTION OF RING GEAR, REVOLUTIONS OF PINION INSTANTANEOUSLY SYNCHRONIZE WITH AND CATCH UP REVOLUTIONS OF RING GEAR (CLUTCH IDLES) | RING GEAR DECELERATES TO BRING THE RING GEAR INTO SLIDABLE CONTACT WITH PINION IN CLUTCH CONNECTING DIRECTION, CAUSING DEVIATION WITH PINION BEING PERMITTED TO MOVE FORWARD | RING GEAR FURTHER DECELERATES AND ENGAGES WITH PINION |

ENGINE STARTING APPARATUS

CROSS-REFERENCE TO RELATED APPLICATION

This application is based on and claims the benefit of priority from earlier Japanese Patent Application No. 2009-106554 filed Apr. 24, 2009, the description of which is incorporated herein by reference.

BACKGROUND OF THE INVENTION

1. Technical Field of the Invention

The present invention relates to an engine starting apparatus which is able to engage a pinion of a starter with a freewheeling ring gear in the course of an engine stop process to restart the engine.

2. Related Art

Providing vehicles with an idle stop system is an important approach to reducing $CO_2$ as one of the countermeasures against global warming. The idle stop system is a system, for example, that stops fuel injection to an engine to automatically stop the engine when the vehicle is stopped at an intersection due to a stop signal or in pause due to traffic jam or the like.

Conventional idle stop systems have been configured to automatically stop an engine after the vehicle has been fully stopped. In order to further improve the effect of reducing $CO_2$, it is effective to elongate an engine stop period. Elongating the engine stop period may be specifically achieved by a system that stops an engine before the vehicle speed runs out (i.e. during the deceleration preceding the vehicle stop), converting from the conventional systems that stop the engine after the vehicle has been fully stopped. It is expected that such a system that elongates the engine stop period may significantly improve the effect of reducing $CO_2$, compared to the conventionally used idle stop systems.

However, this system raises an issue incurred in a potential restart of an engine after the engine has entered an engine stop process. Specifically, in conventional starters, the pinion of the starter cannot be engaged with the ring gear of the engine unless the engine is fully stopped. This means that, in the case where an engine is restarted using a conventional starter, the engine cannot be restarted from the point when the engine has entered the engine stop process up to the point when the engine is completely stopped. There may be a situation, for example, that the traffic light at an intersection is red and the vehicle is decelerated accordingly followed by the output of a stop command to allow the engine to enter the engine stop process, and that, then, the traffic light quickly turns green. In such a situation, conventional starters cannot immediately restart the engine, which may cause trouble to the following vehicle and impose a psychological burden on the user. Accordingly, in order to use the idle stop function while the vehicle is decelerating, it is essential to enable restart of the engine when the engine is in the engine stop process.

In order to realize restart during the engine stop process, the pinion of the starter is required to be in engagement with a ring gear in rotation. A technique as a method of realizing such a restart is disclosed in WO2007/101770. Specifically, this patent document discloses a method of restarting an engine using a starting device that includes a first RPM detecting means that detects the number of revolutions of a ring gear, a second RPM detecting means that detects the number of revolutions of the pinion of a starter or the number of revolutions of a motor, and a motor revolution control driver that controls the number of revolutions of the motor. In this starting device, the number of revolutions of the pinion is controlled by the motor revolution control driver based on the number of revolutions detected by the first and second RPM detecting means, for synchronization with the number of revolutions of the ring gear. As a result, the pinion is engaged with the ring gear.

The method disclosed in WO2007/101770 (the method of synchronizing the number of revolutions of a pinion with that of a ring gear to establish engagement between the gears) is an ideal method in the case where gears distanced from each other are brought into engagement with each other. However, this method has a large problem of requiring a motor revolution control driver that controls the number of revolutions of a motor. Generally, an MOS transistor as a control element is used as a motor revolution control driver to perform voltage control (e.g., pulse width control, so-called PWM control). However, starter motors have a low voltage (usually 12 V) in spite of having a large output. Therefore, this necessitates the use of an MOS transistor having a large current capacity exceeding 500 A and thus greatly raises the cost as a result.

In addition, achieving synchronization between the numbers of revolutions of a pinion and a ring gear may require feedback control of the numbers of revolutions. As a result, a long time will be taken for the synchronization. Therefore, in many cases, there is a concern that synchronization is unlikely to be completed during the very short time in which the engine speed is decreasing.

SUMMARY OF THE INVENTION

The present invention has been made in light of the problems set forth above and has as its object to provide an on-vehicle engine starting apparatus which is able to engage a starter's pinion with an engine's ring gear, which is in the state of decreasing revolutions, during the short time of an engine stop process to thereby restart the engine.

In order to achieve the object, an engine starting apparatus is provided which comprises an electric motor which receives current to generate a rotational force, an output shaft that has an outer periphery surface and rotates by the rotational force, a one-way clutch that is helical-spline-fitted to the outer periphery surface of the output shaft, a pinion that receives the rotational force via the one-way clutch, a pinion pushing device that pushes, together with the one-way clutch, the pinion toward a ring gear of an engine, the one-way clutch having an idling torque smaller than a torque of the ring gear that tries to turn the pinion when the pinion is pushed to the ring gear, and a current switching device that turns on/off the current supplied to the motor. The apparatus further comprises a revolution speed detecting device that detects a revolution speed of the ring gear, and a control device. The control device enables the pinion pushing device to operate when the revolution speed of the ring gear detected by the revolution speed detecting device is larger than a revolution speed of the pinion acquired from a revolution speed of the motor and a relative revolution speed between the revolution speed of the ring gear and the revolution speed of the pinion is a desired value. This control device is able to control the operations of the pinion pushing device and current switching device independently from each other.

In the case where engine restart is requested while the number of revolutions of the ring gear is decreasing in an engine stop process, the engine starting apparatus of the present invention actuates the pinion pushing device when the ring gear and the pinion rotate at predetermined relative numbers of revolutions (the number of revolutions of the ring gear>the number of revolutions of the pinion) to thereby allow the pinion to be pushed to the ring gear side integrally with the one-way clutch.

The actuation of the pinion pushing device brings the end face of the pinion into contact with the end face of the ring gear. When the pinion is pressed against the ring gear being applied with a predetermined load, the number of revolutions of the pinion instantaneously synchronizes with that of the ring gear with the idling of the one-way clutch. This is because the rotational torque of the one-way clutch in an idling state is set smaller than the rotational torque with which the ring gear attempts to rotate the pinion.

From the instance of the synchronization as well, the revolutions of the ring gear still continue decreasing. In this case, however, the pinion will not decrease revolutions synchronized with the revolutions of the ring gear because the one-way clutch is on the connecting side (torque transmitting side). Accordingly, the ring gear will separate from the pinion in the direction opposite to the direction of revolutions, whereby engagement is established between the pinion and the ring gear.

It should be appreciated that the engine speed does not have to be directly detected, but a crank angle sensor or the like may be used.

It is preferred that, in the foregoing configuration, the output shaft provides an axial direction which is along a longitudinal direction of the output shaft, the ring gear has a first periphery surface on which a plurality of teeth are formed, the teeth of the ring gear having a first axial end face facing the pinion and being directed in the axial direction, the pinion has a second periphery surface on which a plurality of teeth are formed, the teeth of the pinion having a second axial end face facing the ring gear and being directed in the axial direction, and recesses are formed on at least one of the first axial end face and the second axial end face and formed in a direction crossing a rotational direction of the ring gear and the pinion.

With this configuration, the pinion is pushed with the actuation of the pinion pushing device. Then, when the end face of the pinion comes into contact with the end face of the ring gear, the recess formed in the pinion end face, for example, will be caught by the teeth of the ring gear. In this way, the revolutions of the pinion can instantaneously follow (synchronize with) those of the ring gear, thereby promptly establishing engagement.

It is also preferred that frictional coefficient increasing means is formed on at least one of the first axial end face and the second axial end face to increase a frictional force thereon.

With this configuration, the pinion is pushed with the actuation of the pinion pushing device. Then, when the end face of the pinion comes into contact with the end face of the ring gear, frictional force between the both end faces will be increased by the frictional coefficient increasing means. In this way, the revolutions of the pinion can instantaneously follow (synchronize with) those of the ring gear, thereby promptly establishing engagement.

Preferably, the recesses are chamfered portions formed at least one of the ring gear and the pinion, the chamfered portions being at least one of i) chamfered portions crossing both the first periphery surface and the first axial end face and ii) chamfered portions crossing both the second periphery surface and the second axial end face.

With this configuration, it is highly probable that the teeth of the pinion and the teeth of the ring gear are caught with each other after in the axial direction after the pinion has come into contact with the ring gear. Thus, reliability in the synchronization of the revolutions between the pinion and the ring gear can be enhanced. In a vehicle having an idle stop function, it is required to consider the case where the engine may be started without using the idle stop function, i.e. started in a conventional manner, for a certain number of times. In this regard, formation of the chamfered portions can ensure the engagement performances based on both of the startup using the idle stop function and the startup in the conventional manner.

Still preferably, the frictional coefficient increasing means is composed of a plurality of grooves. It is preferred that each of the grooves has a depth which is smaller than a module of the pinion and the ring gear. For example, the depth is smaller than 1/n of the module (n is a positive integer of 9 or less). The module is a size (i.e., height) of each tooth of each of the pinion and ring gear.

With this configuration, the frictional coefficient increasing means can be easily formed using a means, such as a knurling tool, which can facilitate processing.

It is also preferred that the motor is a brush type of DC motor having an armature, a rectifier arranged at the armature, a brush made in contact with a surface of the rectifier, and a spring pushing the brush to the surface of the rectifier, wherein the armature has a torque larger than the idling torque of the one-way clutch.

With the actuation of the pinion pushing device, the pinion is pressed by the ring gear and thus the revolutions of the pinion will follow and synchronize with the revolutions of the ring gear. After the synchronization as well, the ring gear still continues decreasing the number of revolutions. Thus, the torque of the ring gear works on the pinion such that the revolutions of the pinion are decreased. In this regard, since the one-way clutch structured integrally with the pinion is on the connecting side (torque transmitting side), the torque that works on the pinion such that the revolutions of the pinion are decreased will be transmitted to the motor side.

Meanwhile, in the motor of the present invention, a braking force works on the revolutions of the armature when the brush is pressed against the surface of the rectifier by the brush spring. Accordingly, the armature is unlikely to be rotated from the ring gear side. As a result, the pinion will not decrease its revolution speed synchronizing with the decreasing revolutions of the ring gear. This will permit easy deviation between the teeth of the pinion and the teeth of the ring gear. Thus, the time required for achieving engagement between the pinion and the ring gear can be shortened.

Preferably, the engine starting apparatus further comprises a reduction device which reduces a rotational speed of the motor and transmits the reduced rotational speed of the motor to the output shaft.

The torque of the ring gear, which works on the pinion such that the revolutions of the pinion are decreased, may be transmitted to the motor side. In such a case, an arrangement of the reduction gear between the motor and the output shaft may allow the armature to be more unlikely to be rotated from the ring gear side. Thus, it is ensured that the teeth of the pinion and the teeth of the ring gear are easily deviated (separated), whereby the time taken for completing engagement between the pinion and the ring gear is further shortened.

Preferably, the control device includes a delay device that allows the current switching device to start to operate when a predetermined period of time has passed since the start of a pushing operation of the pinion.

According to the present invention, the pinion can be fully engaged with the ring gear and then, in this fully engaged state, current is passed to the motor to start the engine. Thus, the pinion and the ring gear can be prevented from being damaged due to potential incomplete engagement therebetween when the revolutions of the ring gear are decreasing in the engine stop process. As a result, the life of each of the gears can be improved in a vehicle having an idle stop function, in which the starter is actuated for a number of times.

BRIEF DESCRIPTION OF THE DRAWINGS

In the accompanying drawings:

FIGS. 4A to 4D are explanatory views illustrating an operation in a first situation, in which a pinion engages with a ring gear which is decreasing revolutions in an engine stop process;

FIGS. 5A to 5D are explanatory views illustrating an operation in a second situation, in which a pinion engages with a ring gear which is decreasing revolutions in an engine stop process;

DETAILED DESCRIPTION OF THE PREFERRED EMBODIMENTS

With reference to the accompanying drawings, hereinafter will be described embodiments of an engine starting apparatus according to the present invention.

Referring to FIGS. 1 to 9, an embodiment of the engine starting apparatus will now be described.

The engine starting apparatus is used for an idle stop system that automatically controls stop and restart of an on-vehicle engine. The engine starting apparatus includes a starter 1 (shown in FIG. 1), an ECU (electronic control unit) 2 (shown in FIG. 3), and an RPM detector 4 (shown in FIG. 3). The starter 1 starts an engine (i.e., internal combustion engine) mounted on a vehicle. The ECU 2 controls the operation of the starter 1. The RPM detector 4 detects a signal indicative of the number of revolutions of a ring gear 3 attached to a crank shaft of the engine and outputs the detected signal to the ECU 2.

Figure 1:
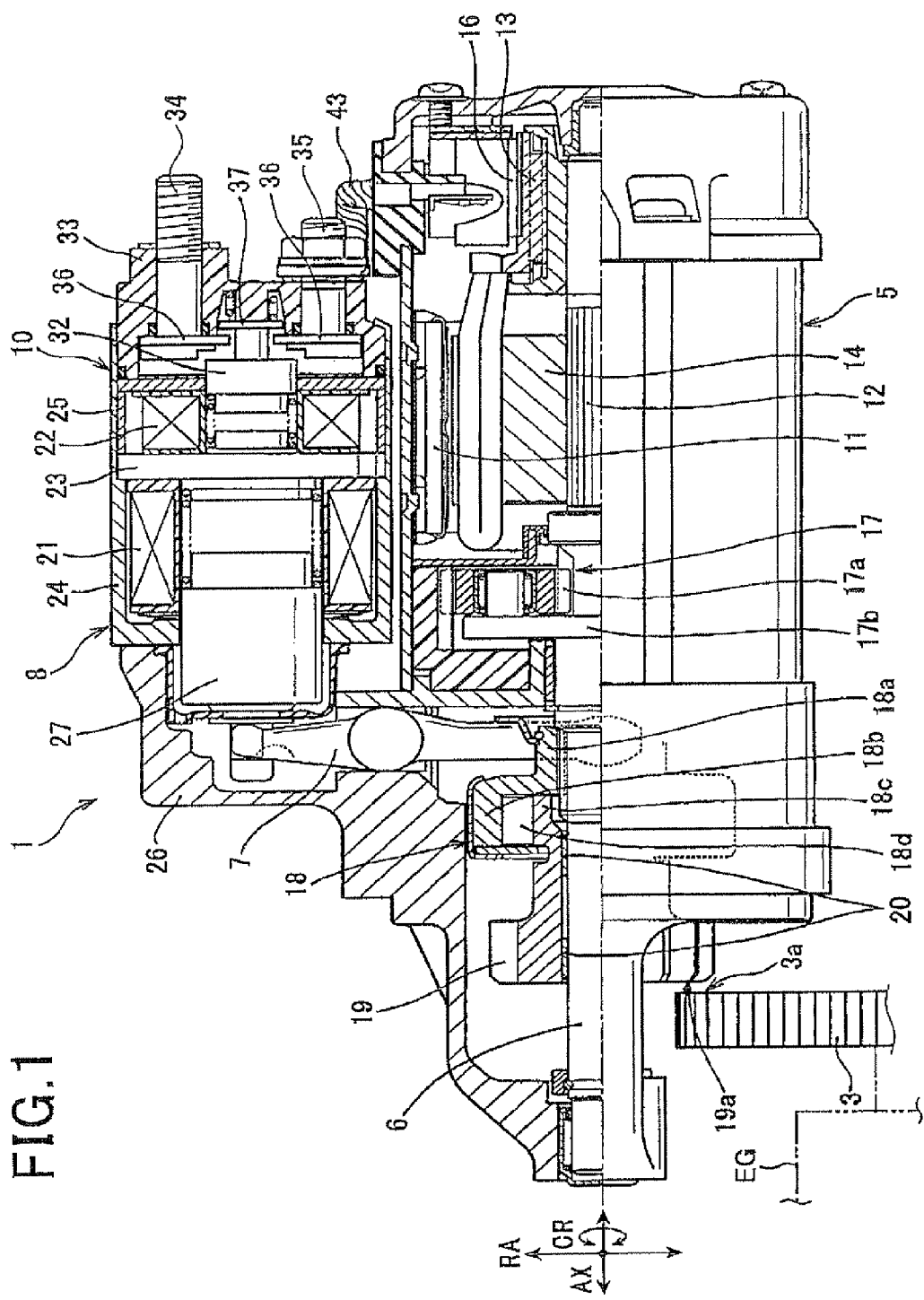
FIG. 1 is a general view, with partly cut, illustrating a starter incorporated in an engine starting apparatus according to an embodiment of the present invention.

As shown in FIG. 1, the starter 1 includes an electric motor 5, an output shaft 6, a pinion movable body (described later), a shift lever 7, a pinion-pushing solenoid 8, a battery 9, and a motor electrification switch 10. In the present embodiment, directions can be defined such that longitudinal directions of the output shaft 6 are axial directions AX, radially extending directions from the output shaft 6 along a plane perpendicular to the axial directions are radial directions RA, and directions circulating around the axial directions along the plane perpendicular to the axial directions are circumferential directions CR.

The motor 5 generates torque in response to current supply thereto. The output shaft 6 rotates being transmitted with the torque generated by the motor 5. The pinion movable body is provided such that it is axially movable on the outer periphery of the output shaft 6. The pinion-pushing solenoid 8 has a function of pushing the pinion movable body in the direction opposite to the motor (leftward in FIG. 1) via the shift lever 7. The motor electrification switch 10 opens/closes a motor contact which is provided at a motor circuit to pass current from the battery 9 (see FIG. 3) to the motor 5.

The motor 5 is an electric dc motor with a brush, including a field magnet 11, armature 14 and a brush 16. The field magnet 11 is configured by a plurality of permanent magnets. The armature 14 includes an armature shaft 12 with its one end being provided with a rectifier 13. The brush 16 is arranged being in contact with an outer peripheral surface of the rectifier 13 (hereinafter referred to as a "rectifier surface") and pressed against the rectifier surface by a brush spring 15 (see FIG. 9). The field magnet 11 of the motor 5, which is made up of the permanent magnets, may be replaced by a field electromagnet made up of a field coil.

The output shaft 6 is arranged being aligned with the armature shaft 12 via a reduction gear 17. Thus, the revolutions of the motor 5 are transmitted being reduced by the reduction gear 17.

The reduction gear 17 is a known planetary reduction gear, for example, in which a planetary carrier 17b that picks up the orbital motion of a planetary gear 17a is provided being integrated with the output shaft 6.

The pinion movable body is configured by a clutch 18 and a pinion 19.

The clutch 18 includes a spline sleeve 18a, an outer 18b, an inner 18c, a roller 18d and a roller spring (not shown). The spline sleeve 18a is helical-spline-fitted to the outer periphery of the output shaft 6. The outer 18b is provided being integrated with the spline sleeve 18a. The inner 18c is relatively rotatably arranged at the inner periphery of the outer 18b. The roller 18d is located between the outer 18b and the inner 18c to connect/disconnect torque therebetween. The roller spring has a role of biasing the roller 18d. The clutch 18 is provided as a one-way clutch that unidirectionally transmits torque from the outer 18b to the inner 18c via the roller 18d.

The pinion 19 is integrated with the inner 18c of the clutch 18 and relatively rotatably supported by the outer periphery of the output shaft 6 via bearings 20.

The pinion-pushing solenoid 8 and the motor electrification switch 10 have a solenoid coil 21 and a switch coil 22, respectively, each of which forms an electromagnet when current is passed. A fixed core 23 is arranged between the solenoid coil 21 and the switch coil 22 so as to be commonly used by these coils. The outer periphery of the pinion-pushing solenoid 8 is covered with a solenoid yoke 24, while the outer periphery of the motor electrification switch 10 is covered with a switch yoke 25. The solenoid yoke 24 and the switch yoke 25 are integrally and continuously formed in the axial directions AX to provide a single overall yoke. In other words, as shown in FIG. 1, the solenoid 8 and the switch 10 are integrally configured in series in the axial directions AX, disposed being parallel to the motor 5, and fixed to a starter housing 26.

Figure 2:
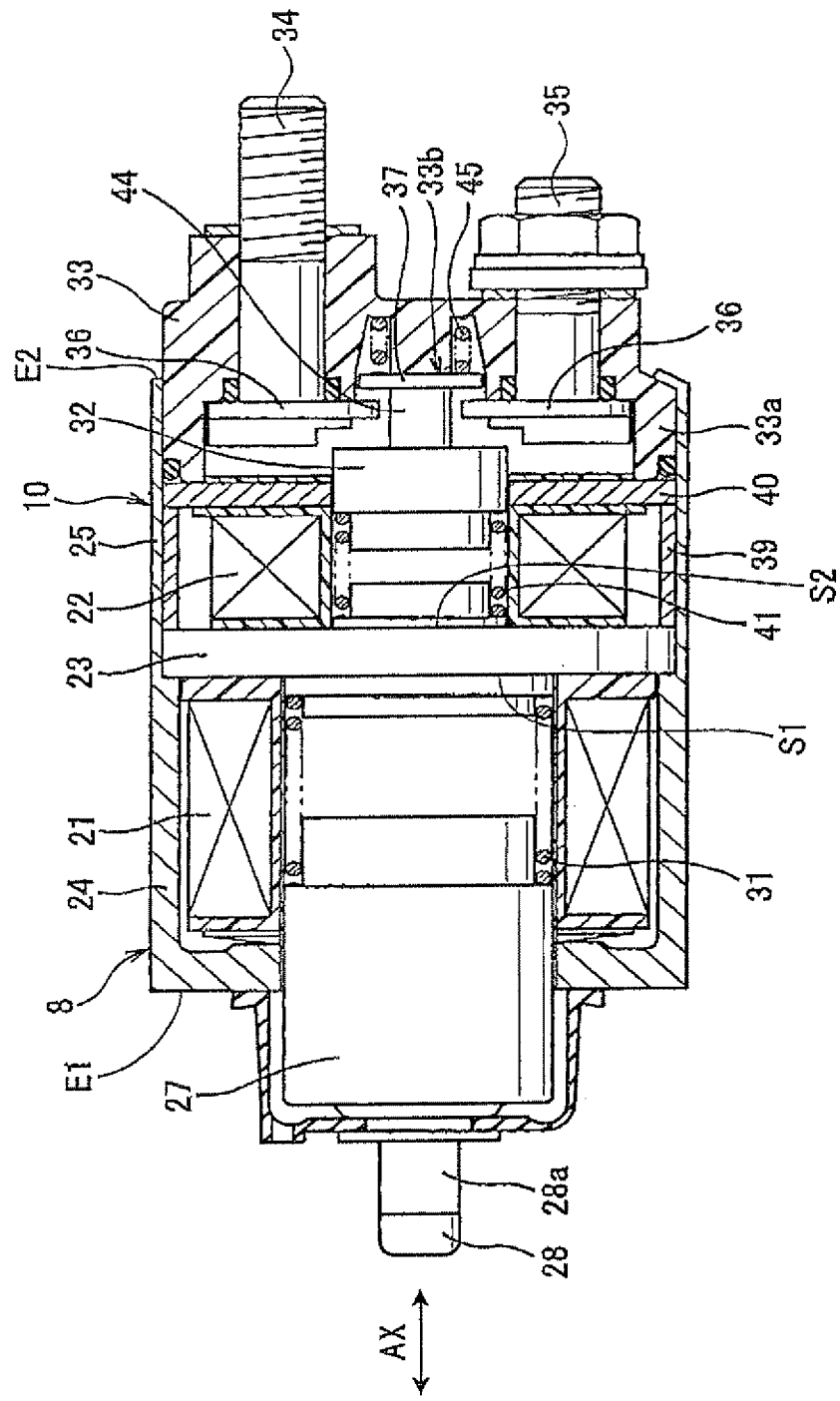
FIG. 2 is a cross-sectional view illustrating a pinion-pushing solenoid and a motor electrification switch of the starter.

FIG. 2 is a cross-sectional view illustrating the pinion-pushing solenoid 8 and the motor electrification switch 10 of the starter 1. As shown in FIG. 2, the overall yoke has a bottomed cylindrical shape with one axial end (first end E1) (left side in FIG. 2) being provided with an annular bottom and the other axial end (second end E2) being opened. The outer diameter of the overall yoke is made even from the first end E1 to the second end E2. However, the inner diameter of the switch yoke 25 is ensured to be larger than that of the solenoid yoke 24. Accordingly, the thickness of the switch yoke 25 is smaller than that of the solenoid yoke 24. In other words, the inner peripheral surface of the overall yoke has a step between the solenoid yoke 24 and the switch yoke 25.

The fixed core 23 is inserted from an open end that is the second end E2 of the overall yoke (open end of the switch yoke 25) into the inside of the switch yoke 25. The inserted fixed core 23 has a radially outer end face on the first end E1 side. This radially outer end face is brought into contact with the step provided at the inner peripheral surface of the overall yoke, between the solenoid yoke 24 and the switch yoke 25, to determine the axial position of the fixed core 23.

Figure 3:
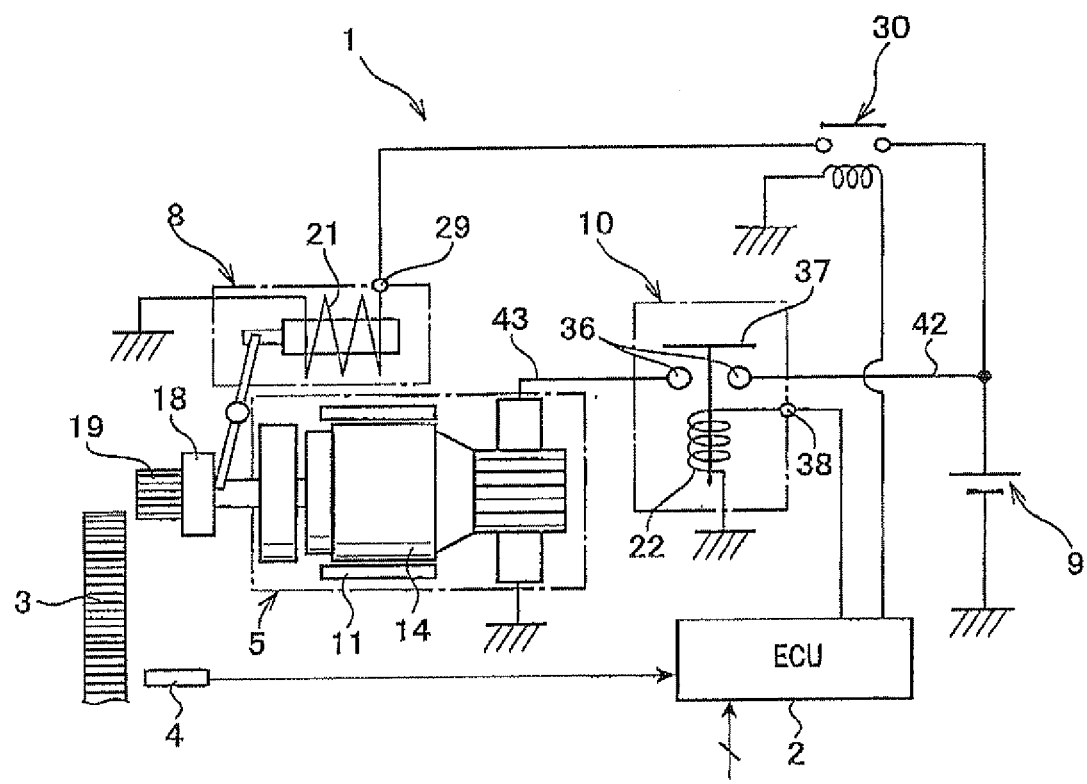
FIG. 3 is an electric circuit diagram illustrating the engine starting apparatus of the starter.

Referring to FIGS. 2 and 3, hereinafter is described the configurations of the pinion-pushing solenoid 8 and the motor electrification switch 10, except for the overall yoke (the solenoid yoke 24 and the switch yoke 25) and the fixed core 23.

The pinion-pushing solenoid 8 includes the solenoid coil 21, a plunger 27 and a joint 28. The solenoid coil 21 is arranged along the inner periphery of the solenoid yoke 24 that forms a part of the overall yoke on the first end E1 side. The plunger 27 is disposed being opposed to one radially inner attractive surface S1 of the fixed core 23 and is permitted to be axially movable along the inner periphery of the solenoid coil 21. The joint 28 transmits the movement of the plunger 27 to the shift lever 7.

FIG. 3 is an electric circuit diagram illustrating the engine starting apparatus of the starter 1. As shown in FIG. 3, the solenoid coil 21 has an end connected to a connector terminal 29 and the other end grounded being fixed to a surface of the fixed core 23, for example, by welding or the like. An electrical wiring connected to a starter relay 30 is connected to the connector terminal 29.

The starter relay 30 is subjected to on/off control of the ECU 2. When the starter relay 30 is controlled and turned on, current is passed from the battery 9 to the solenoid coil 21 via the starter relay 30.

When the fixed core 23 is magnetized with the supply of current to the solenoid coil 21, the plunger 27 is attracted to the attractive surface S1 of the fixed core 23 against the reaction force of a return spring 31 disposed between the fixed core 23 and the plunger 27. Then, when the current supply to the solenoid coil 21 is stopped, the plunger 27 is pushed back by the reaction force of the return spring 31 in the direction opposite to the fixed core 23 (leftward in FIG. 2). The plunger 27 has substantially a cylindrical shape with a cylindrical hole being formed at its radially central portion. The cylindrical hole is open at one axial end of the plunger 27 and bottomed at the other end thereof.

The joint 28 having a shape of a rod is inserted into the cylindrical hole of the plunger 27 together with a drive spring (not shown). Thus, the joint 28 has an end portion projected from the cylindrical hole of the plunger 27. This end portion of the joint 28 is formed with an engagement groove 28a with which one end portion of the shift lever 7 engages. The other end portion of the joint 28 is provided with a flange portion. The flange portion has an outer diameter that enables the flange portion to be slidably movable along the inner periphery of the cylindrical hole. The flange portion, being loaded by the drive spring, is being pressed against the bottom face of the cylindrical hole.

With the movement of the plunger 27, an end face 19a (see FIG. 1) of the pinion 19 pushed in the direction opposite to the motor comes into contact with an end face 3a (see FIG. 1) of the ring gear 3. Then, the drive spring is permitted to bow while the plunger 27 is permitted to move and attracted to the attractive surface S1 of the fixed core 23. Thus, the drive spring accumulates reaction force that allows the pinion 19 to engage the ring gear 3.

The motor electrification switch 10 includes the switch coil 22, a movable core 32, a contact cover 33, two terminal bolts 34 and 35, a pair of fixed contacts 36, and a movable contact 37. The switch coil 22 is arranged along the inner periphery of the switch yoke 25 forming a part of the overall yoke on the second end E2 side. The movable core 32 faces the other radially inner attractive surface S2 of the fixed core 23 and is permitted to be movable in the axial directions AX of the switch coil 22. The contact cover 33, which is made of resin, is assembled, blocking the open end, i.e. the second end E2, of the overall yoke (the open end of the switch yoke 25). The two terminal bolts 34 and 35 are fixed to the contact cover 33. The pair of fixed contacts 36 are fixed to the two terminal bolts 34 and 35. The movable contact 37 electrically connects/disconnects between the pair of fixed contacts 36.

As shown in FIG. 3, the switch coil 22 has one end connected to an external terminal 38, and the other end grounded being fixed, for example, to a surface of the fixed core 23 by welding or the like. The external terminal 38 is provided being projected out of an axial end face of the contact cover 33, for connection to an electrical wiring connected to the ECU 2.

The switch coil 22 has a radially outer peripheral side on which an axial magnetic path member 39 is arranged to form a part of a magnetic path. Also the switch coil 22 has an axial side opposite to the fixed core, on which a radial magnetic path member 40 is arranged to form a part of the magnetic path.

The axial magnetic path member 39 has a cylindrical shape and is inserted into the switch yoke 25 along the inner periphery thereof with substantially no gap being provided therebetween. The axial magnetic path member 39 has an axial end face on the first end E1 side, which axial end face is brought into contact with a radially outer end face of the fixed core 23 to determine the axial position of the member 39.

The radial magnetic path member 40 is arranged perpendicular to the axis of the switch coil 22. The radial magnetic path member 40 has a radially outer end face on the first end E1 side, which surface is brought into contact with an axial end face of the axial magnetic path member 39 to constrain the position of the member 40 with respect to the switch coil 22. The radial magnetic path member 40 has a round opening at its radial central portion so that the movable core 32 can move therethrough in the axial directions AX.

The fixed core 23 is magnetized upon supply of current to the switch coil 22. Then, the movable core 32 is attracted to the attractive surface S2 of the fixed core 23 against the reaction force of the return spring 41 disposed between the fixed core 23 and the movable core 32. When the current supply to the switch coil 22 is stopped, the movable core 32 is pushed back in the direction opposite to the fixed core 23 (rightward in FIG. 2) by the reaction force of the return spring 41.

The contact cover 33 has a cylindrical leg portion 33a. The leg portion 33a is inserted into the switch yoke 25 along the inner periphery thereof, the switch yoke 25 forming a part of the overall yoke on the second end E2 side. The contact cover 33 is arranged, with the end face of the leg portion 33a being in contact with a surface of the radial magnetic path member 40, and caulked and fixed to the open end, i.e. the second end E2, of the overall yoke.

The terminal bolt 34, one of the two terminal bolts, is a B terminal bolt 34 to which a battery cable 42 (see FIG. 3) is connected. The terminal bolt 35, the other of the two terminal bolts, is an M terminal bolt 35 to which a motor lead 43 (see FIGS. 1 and 3) is connected. The pair of fixed contacts 36, which are provided separately from (or may be provided integrally with) the two terminal bolts 34 and 35, are electrically in contact with the two terminal bolts 34 and 35 inside the contact cover 33 and mechanically fixed to the contact cover 33.

The movable contact 37 is arranged so that the distance from the movable contact 37 to the movable core is larger than the distance from the pair of fixed contacts 36 to the movable core (rightward in FIG. 2). The movable contact 37 is in reception of the load of a contact-pressure spring 45 and pressed against an end face of a resin rod 44 fixed to the movable core 32. It should be appreciated that the initial load of the return spring 41 is set larger than that of the contact-pressure spring 45. Therefore, when the switch coil 22 is de-energized, the movable contact 37 is seated on an inner seat 33b of the contact cover 33, with the contact-pressure spring 45 being contracted.

The motor contact mentioned above is formed of the pair of fixed contacts 36 and the movable contact 37. Being biased by the contact-pressure spring 45, the movable contact 37 comes into contact with the pair of fixed contacts 36 with a predetermined pressing force. Resultantly, current is passed across the pair of fixed contacts 36 via the movable contact 37 to thereby close the motor contact. When the movable contact 37 is drawn apart from the pair of fixed contacts 36, the current across the pair of fixed contacts 36 is shut down to thereby open the motor contact.

a) Referring to FIGS. 4A to 4D and FIGS. 6 to 9, an operation is described taking as an example a first situation in which engine restart is requested while the number of revolutions of the ring gear 3 is decreasing in an engine stop process.

FIG. 4A illustrates a process in which the pinion 19 moves forward to the ring gear 3 which is decreasing the number of revolutions. FIG. 4B illustrates a state where the end face 19a of the pinion 19 is in contact with the end face 3a of the ring gear 3. FIG. 4C illustrates a process in which the positions of the pinion 19 and the ring gear 3 are relatively deviated in the direction of revolutions. FIG. 4D illustrates a state where the pinion 19 is brought into engagement with the ring gear 3 in a decelerating state.

Figure 6:
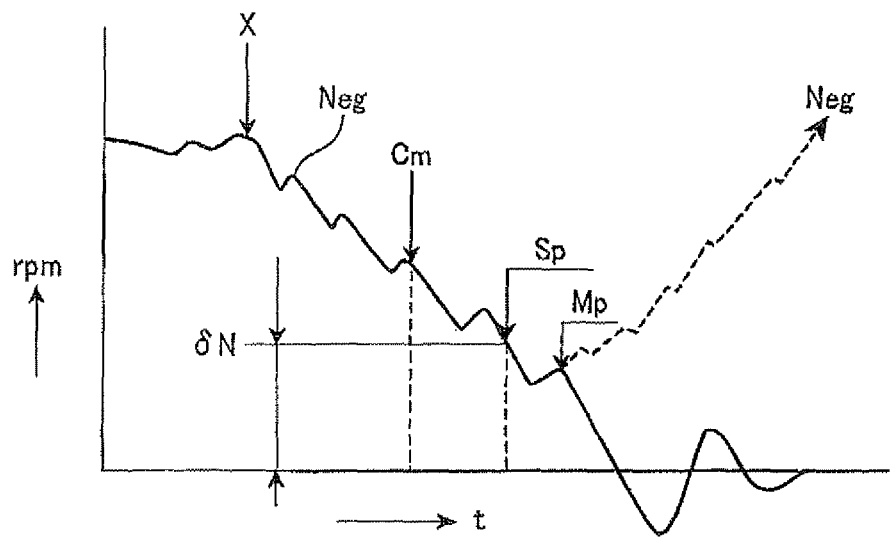
FIG. 6 is a graph illustrating engine speed in an engine stop process with time being indicated on the horizontal axis.

FIG. 6 is a graph illustrating engine speed Neg in the engine stop process with time being indicated on the horizontal axis. In FIG. 6, "X" indicates a point of generation of an engine stop signal, "Cm" indicates a point when an engine restart request is given by the driver's free will, "Sp" indicates an actuation start point of the pinion-pushing solenoid 8, "δN" indicates relative numbers of revolutions of the ring gear 3 and the pinion 19, and "Mp" indicates an actuation start point of the motor electrification switch 10.

After generation of an engine stop signal at the point X of FIG. 6, an engine restart request may be given by the driver at the point Cm. Then, the ECU 2 permits the RPM detector 4 to input the number of revolutions of the ring gear 3 at the time the request has been given. If the number of revolutions of the ring gear 3 is lower than a predetermined number of revolutions, the starter relay 30 is controlled and turned on at the point (point Sp of FIG. 6) when the relative numbers of revolutions of the ring gear 3 and the pinion 19 have reached δN. At this point, the number of revolutions of the motor 5 is "0" because the motor electrification switch 10 has not been actuated (no current is passed to the switch coil 22). Accordingly, the relative numbers of revolutions will be expressed as: δN=the number of revolutions of the ring gear 3.

Figure 7:
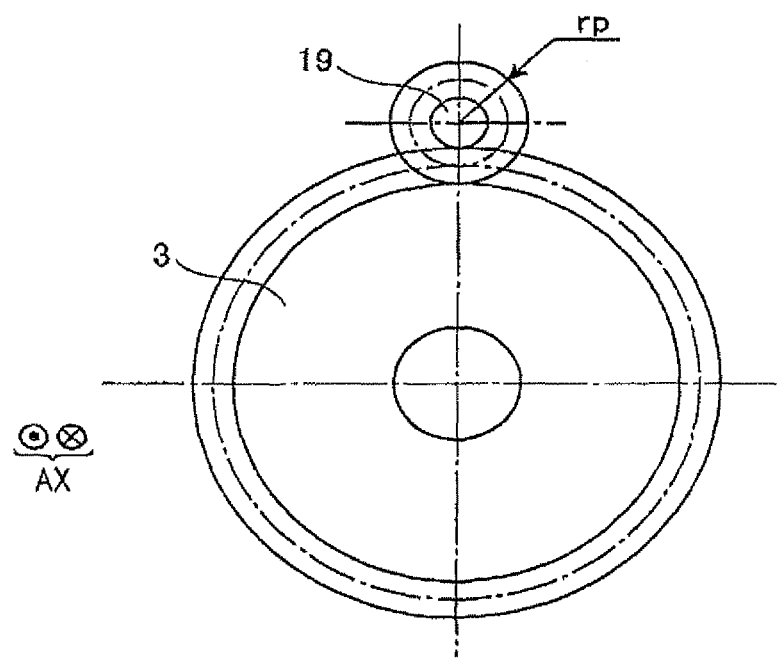
FIG. 7 is a diagram illustrating the ring gear and the pinion as viewed from the axial direction.

When the starter relay 30 is closed, current is supplied from the battery 9 to the solenoid coil 21 of the pinion-pushing solenoid 8. Then, the plunger 27 is moved, being attracted to the magnetized fixed core 23. With the movement of the plunger 27, the pinion movable body (the clutch 18 and the pinion 19) is pushed in the direction opposite to the motor via the shift lever 7. Then, as shown in FIGS. 4A and 4B, the pinion 19 moves forward to the ring gear 3 which is decreasing the number of revolutions. As a result, the end face 19a of the pinion 19 is pressed against the end face 3a of the ring gear 3 applied with a predetermined load F1. In this case, a rotational torque T1 with which the ring gear 3 attempts to rotate the pinion 19 can be expressed by the following Formula (1):

$$T1 = F1 \times rp \times \mu 1 \quad (1)$$

where μ1 is a frictional coefficient between the end face 19a of the pinion 19 and the end face 3a of the ring gear, rp is a pitch circle radius of the pinion 19 (see FIG. 7).

In this case, a rotational torque T2 of the clutch 18 in an idling state may be set smaller than the rotational torque T1 (T1>T2). Thus, the revolutions of the pinion 19 catch up and synchronize with the revolutions of the ring gear 3. In this regard, at least either the end face 19a of the pinion 19 or the end face 3a of the ring gear 3 may be formed with a frictional coefficient increasing means, so that the frictional coefficient may be increased at each of the teeth of either the pinion 19 or the ring gear 3.

Figure 8:
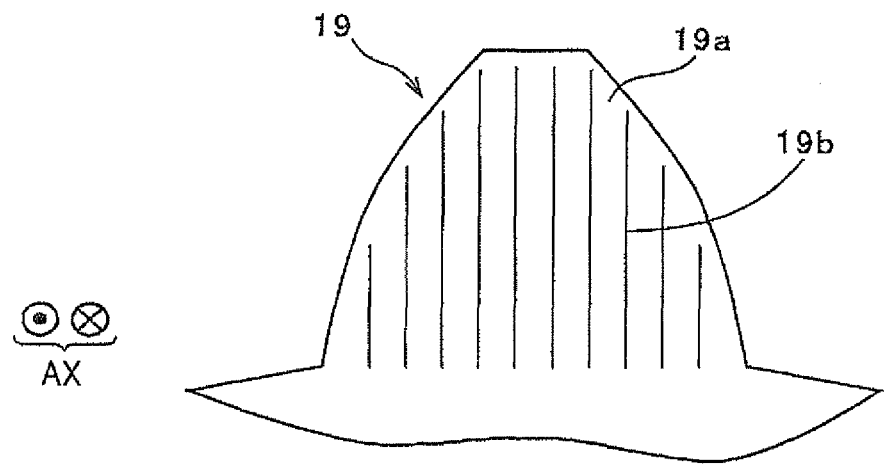
FIG. 8 is a diagram illustrating an example of a frictional coefficient increasing means formed in a pinion end face.

For example, as shown in FIG. 8, which is an illustration of the end face 19a of the pinion 19, a plurality of grooves 19b may be formed in the end face 19a. In this case, each of the grooves 19b may have a depth which is smaller than a module of the pinion and the ring gear. Preferably, the depth is smaller than 1/n of the module (n is a positive integer of 9 or less). The module is defined as a size (i.e., height) of each tooth of each of the pinion and ring gear. Thus, the frictional force between the end face 19a of the pinion 19 and the end face 3a of the ring gear 3 will be increased when both of the end faces are brought into contact with each other. Accordingly, the revolutions of the pinion 19 can instantaneously synchronize with the revolutions of the ring gear 3.

Figure 9:
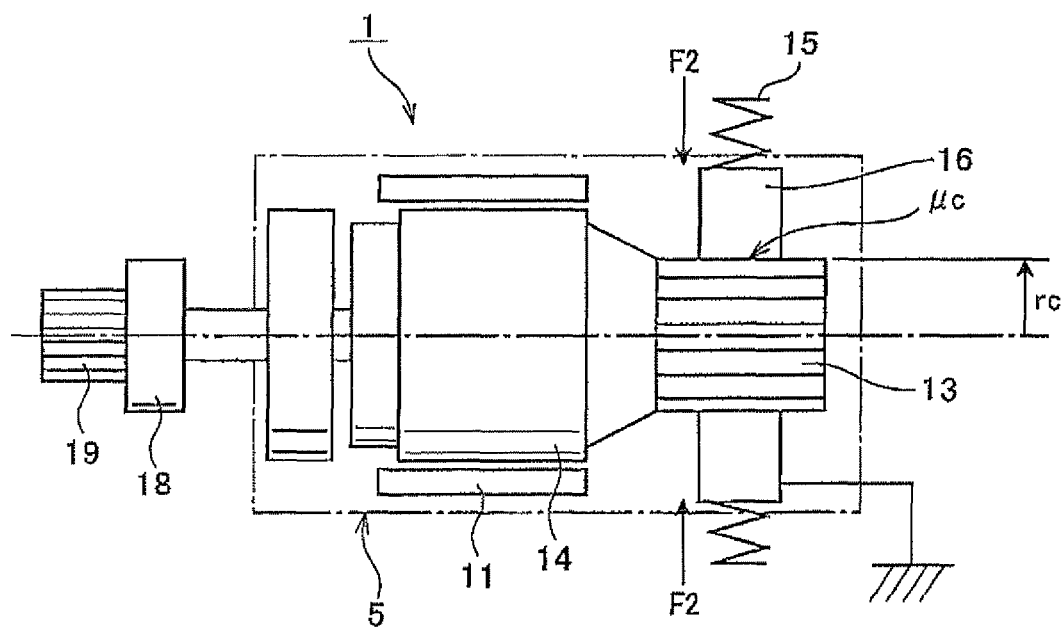
FIG. 9 is a schematic diagram illustrating the configuration of a motor with a brush.

From the point of synchronization as well, the ring gear 3 still continues decreasing revolutions. However, since the clutch 18 is now on the connecting side (torque transmitting side), the rotational torque which is received by the pinion 19 from the ring gear 3 will be a torque T3 that rotates the armature 14 of the motor 5. FIG. 9 is a schematic diagram illustrating the configuration of the motor 5 with a brush. As shown in FIG. 9, in the case where the brush 16 is pressed against the outer periphery of the rectifier 13 having a radius rc with a frictional coefficient μc, the rotational torque T3 that rotates the armature 14 can be expressed by the following formula (2):

$$T3 = F2 \times rc \times \mu c \quad (2)$$

In this case, the rotational torque T3 for rotating the armature 14 may be set larger than the rotational torque T2 of the clutch 18 in an idling state (T3>T2). Thus, the frictional force caused between the end faces of the pinion 19 and the ring gear 3 will be smaller than the rotational torque T3 that rotates the armature 14. Therefore, the pinion 19 will not decrease the number of revolutions keeping synchronization with the revolutions of the ring gear 3. Instead, as shown in FIG. 4C, the ring gear 3 will be deviated with respect to the pinion 19 in the direction opposite to the direction of revolutions (rightward in FIG. 4C). As a result, as shown in FIG. 4D, each of the teeth of the pinion 19 is pushed between the teeth of the ring gear 3 to thereby achieve engagement between the pinion 19 and the ring gear 3.

After completion of the engagement between the pinion 19 and the ring gear 3 and then after expiration of a predetermined time (point Mp of FIG. 6), the ECU 2 outputs a turn-on signal to the motor electrification switch 10.

When current is passed through the switch coil 22 of the switch 10, the movable core 32 is attracted to the fixed core 23 to allow the movable contact 37 to come into contact with the pair of fixed contacts 36. Then, being biased by the contact-pressure spring 45, the motor contact is closed. As a result, current is supplied from the battery 9 to the motor 5 to generate torque in the armature 14. The torque is then transmitted to the output shaft 6 via the reduction gear 17. Further, the torque of the output shaft 6 is transmitted to the pinion 19 via the clutch 18. Since the pinion 19 has already been in engagement with the ring gear 3, the revolutions of the pinion 19, as they are, are transmitted to the ring gear 3. In this way, as plotted with the broken line in the graph of FIG. 6, the engine speed Neg increases, whereby the engine is restarted.

b) Referring to FIGS. 5A to 5D, an operation is described taking as an example a second situation in which engine restart is requested while the number of revolutions of the ring gear 3 is decreasing in an engine stop process.

In the second situation, when the pinion movable body (the clutch 18 and the pinion 19) is pushed to the ring gear side with the actuation of the pinion-pushing solenoid 8, a chamfered portion 19c formed in each of the teeth of the pinion 19 is caught by a chamfered portion 3b formed in each of the teeth of the ring gear 3. The chamfered portion 19c of the pinion 19 and the chamfered portion 3b of the ring gear are also examples of the recesses recited in claim 2 of the present invention. As shown in FIG. 5B, the chamfered portion 19c is formed at a corner of each tooth of the pinion 19, and the chamfered portion 3b is formed at a corner of each tooth of the ring gear 3. These chamfered portions (the recesses of the present invention) may be formed in either one of the pinion 19 and the ring gear 3.

As shown in FIG. 5B, in the second situation, when each chamfered portion 19c of the pinion 19 is caught by each chamfered portion 3b of the ring gear 3, the revolutions of the pinion 19 instantaneously synchronize with the revolutions of the ring gear 3. In this regard, similar to the first situation, the rotational torque T2 of the clutch 18 in an idling state is set smaller than the rotational torque T1 that rotates the pinion 19 from the ring gear 3 side, while the rotational torque T3 that rotates the armature 14 is set larger than the rotational torque T2 of the clutch 18 in an idling state.

Even from the instant when the revolutions of the pinion 19 synchronize with the revolutions of the ring gear 3, the number of revolutions of the ring gear 3 still continues decreasing. Accordingly, as shown in FIG. 5C, the ring gear 3 will be deviated with respect to the pinion 19 in the direction opposite to the direction of revolutions (rightward in FIG. 5C). As a result, as shown in FIG. 5D, each of the teeth of the pinion 19 is pushed between the teeth of the ring gear 3 to thereby achieve engagement between the pinion 19 and the ring gear 3. After completion of the engagement between the pinion 19 and the ring gear 3 and then after expiration of a predetermined time (point Mp of FIG. 6), the ECU 2 outputs a turn-on signal to the motor electrification switch 10. Resultantly, the torque of the motor 5 is transmitted from the pinion 19 to the ring gear 3, whereby the engine is restarted.

In the engine starting apparatus of the present invention, the pinion-pushing solenoid 8 is actuated to permit the end face 19a of the pinion 19 to be in contact with the end face 3a of the ring gear 3. With this contact, the end face 19a of the pinion 19 is pressed against the end face 3a of the ring gear 3 with the predetermined load F1. Meanwhile, the rotational torque T2 of the clutch 18 in an idling state is set smaller than the rotational torque T1 with which the ring gear 3 in a decelerating state attempts to rotate the pinion 19. Therefore, the revolutions of the pinion 19 can instantaneously synchronize with the revolutions of the ring gear 3. As a result, engagement can be promptly established between the ring gear 3 and the pinion 19.

According to the configuration and scheme described above, the expensive motor revolution control driver disclosed in WO2007/101770 will not be needed. Accordingly, the engine starting apparatus can be provided at low cost.

In the conventional art disclosed in WO2007/101770, the number of revolutions has to be fed back in permitting the number of revolutions of the pinion 19 to synchronize with that of the ring gear. However, with the engine starting apparatus of the present invention, the revolutions of the pinion 19 can be instantaneously synchronized with the revolutions of the ring gear 3. Thus, the number of revolutions does not have to be fed back. In addition, when engine restart is requested while the number of revolutions of the ring gear is decreasing, the pinion 19 can be reliably brought into engagement with the ring gear to restart the engine in a short time.

The engine starting apparatus of the present invention is different from the conventional engine starting apparatuses using starters (i.e. the apparatuses in which the end face 19a of the pinion 19 comes into contact with the end face 3a of the ring gear 3 being applied with a predetermined load, and then engagement is forcibly established by the torque of the motor 5). Specifically, the engine starting apparatus of the present invention utilizes the inert revolutions (i.e., revolutions due to inertia) of the ring gear 3 in the engine stop process, for the engagement of the pinion 19 with the ring gear 3. Therefore, the load imposed between the teeth of the pinion 19 and the teeth of the ring gear 3 is mitigated, exerting an effect of significantly reducing wearing between the ring gear 3 and the pinion 19. Thus, the engine starting apparatus of the present invention can be appropriately used for an idle stop system in which the number of actuations of the starter 1 is significantly increased.

In the conventional engine starting apparatuses using starters, the pinion 19 has been brought into engagement with the ring gear that remains stationary, utilizing the torque of the motor 5. Therefore, if the engagement is unsuccessful once, the relative numbers of revolutions of the pinion 19 and the ring gear 3 will be increased with time, no longer enabling engagement. In this regard, with the engine starting apparatus of the present invention, the revolutions of the pinion 19 are synchronized with those of the ring gear 3 during the process in which the number of revolutions of the ring gear 3 is decreasing, and then engagement is established. Thus, the relative numbers of revolutions of the pinion 19 and the ring gear 3 will be approximated with time, whereby engagement can be easily achieved. Accordingly, compared to the conventional engine starting apparatuses using starters, the engine starting apparatus of the present invention can significantly and highly reliably reduce the probability of failure of engagement between the pinion 19 and the ring gear 3.

(Modifications)

In the embodiment described above, the starter relay 30 has been turned on to actuate the pinion-pushing solenoid 8 (at this point, current has not yet been supplied to the switch coil 22 of the motor electrification switch 10) under the conditions where: the number of revolutions of the ring gear 3 at the point when engine restart is requested is lower than a predetermined number of revolutions; and the relative numbers of revolutions of the ring gear 3 and the pinion 19 have reached δN (the number of revolutions of the ring gear 3=δN). However, when the number of revolutions of the ring gear 3 at the point when engine restart is requested is higher than the predetermined number of revolutions, the switch 10 may be actuated prior to the actuation of the solenoid 8, followed by actuating the solenoid 8 at the point when the relative numbers of revolutions of the ring gear 3 and the pinion 10 have reached δN. In this case, it is not required to wait for the number of revolutions of the ring gear 3 to become equal to or lower than the predetermined number of revolutions. Accordingly, engine restart can be carried out in a short time.

In this modification, the relative numbers of revolutions of the ring gear 3 and the pinion 19 can be determined based on the number of revolutions of the ring gear 3 detected by the RPM detector 4, and a predetermined logic set according to an estimated ascending curve of the number of revolutions of the motor (rising curve of the motor 5).

What is claimed is:

1. An engine starting apparatus comprising
an electric motor that receives supply of current to generate a rotational force,
an output shaft that has an outer periphery surface and rotates by the rotational force,
a one-way clutch that is helical-spline-fitted to the outer periphery surface of the output shaft,
a pinion that receives the rotational force via the one-way clutch,
pinion pushing means that pushes, together with the one-way clutch, the pinion toward a ring gear of an engine in a state where the ring gear is revolving due to inertia, the one-way clutch having an idling torque being set to be smaller than a torque of the ring gear that turns the pinion in a state where the ring gear is in contact with the pushed pinion and the ring gear is rotating, wherein the pinion has a radius that is smaller than a radius of the ring gear;
current switching means that turns on/off the current supplied to the motor, the current switching means being operative independently from the pinion pushing means;
revolution speed detecting means that detects a revolution speed of the ring gear; and
control means that enables the pinion pushing means to push the pinion when the control means determines that a relative revolution speed, which is a difference between the revolution speed of the ring gear detected by the revolution speed detecting means and a revolution speed of the pinion acquired from a revolution speed of the motor, arrives at a desired value obtained in a state where the revolution speed of the ring gear is larger than the revolution speed of the pinion.

2. The engine starting apparatus of claim 1, wherein
the output shaft provides an axial direction which is along a longitudinal direction of the output shaft,
the ring gear has a first periphery surface on which a plurality of teeth are formed, the teeth of the ring gear having a first axial end face facing the pinion and being directed in the axial direction,
the pinion has a second periphery surface on which a plurality of teeth are formed, the teeth of the pinion having a second axial end face facing the ring gear and being directed in the axial direction, and
recesses are formed on at least one of the first axial end face and the second axial end face and formed in a direction crossing a rotational direction of the ring gear and the pinion.

3. The engine starting apparatus of claim 2, wherein the recesses are chamfered portions formed on at least one of the ring gear and the pinion, the chamfered portions being at least one of i) chamfered portions crossing both the first periphery surface and the first axial end face and ii) chamfered portions crossing both the second periphery surface and the second axial end face.

4. The engine starting apparatus of claim 2, wherein
the output shaft provides an axial direction which is along a longitudinal direction of the output shaft,
the ring gear has a first periphery surface on which a plurality of teeth are formed, the teeth of the ring gear having a first axial end face facing the pinion and being directed in the axial direction,
the pinion has a second periphery surface on which a plurality of teeth are formed, the teeth of the pinion having a second axial end face facing the ring gear and being directed in the axial direction, and
frictional coefficient increasing means that is formed on at least one of the first axial end face and the second axial end face to increase a frictional force thereon.

5. The engine starting apparatus of claim 4, wherein
the frictional coefficient increasing means is comprised of a plurality of grooves, and
each of the grooves has a depth which is smaller than a module of at least one of the pinion and the ring gear, the module describing a size of the at least one of the pinion and the ring gear.

6. The engine starting apparatus of claim 5, wherein
the motor is a brush type of DC motor having an armature, a rectifier arranged at the armature, a brush made in contact with a surface of the rectifier, and a spring pushing the brush to the surface of the rectifier, and
the armature has a torque larger than the idling torque of the one-way clutch.

7. The engine starting apparatus of claim 6, further comprising a reduction device which reduces a rotational speed of the motor and transmits the reduced rotational speed of the motor to the output shaft.

8. The engine starting apparatus of claim 7, wherein the control means includes delay means that allows the current switching means to start to operate when a predetermined period of time has passed since a start of a pushing operation of the pinion.

9. The engine starting apparatus of claim 2, wherein
the motor is a brush type of DC motor having an armature, a rectifier arranged at the armature, a brush made in contact with a surface of the rectifier, and a spring pushing the brush to the surface of the rectifier, and
the armature has a torque larger than the idling torque of the one-way clutch.

10. The engine starting apparatus of claim 9, further comprising a reduction device which reduces a rotational speed of the motor and transmits the reduced rotational speed of the motor to the output shaft.

11. The engine starting apparatus of claim 1, wherein
the output shaft provides an axial direction which is along a longitudinal direction of the output shaft,
the ring gear has a first periphery surface on which a plurality of teeth are formed, the teeth of the ring gear having a first axial end face facing the pinion and being directed in the axial direction,
the pinion has a second periphery surface on which a plurality of teeth are formed, the teeth of the pinion having a second axial end face facing the ring gear and being directed in the axial direction, and
frictional coefficient increasing means is formed on at least one of the first axial end face and the second axial end face to increase a frictional force thereon.

12. The engine starting apparatus of claim 11, wherein the frictional coefficient increasing means is composed of a plurality of grooves.

13. The engine starting apparatus of claim 12, wherein each of the grooves has a depth which is smaller than a module of at least one of the pinion and the ring gear, the module describing a size of the at least one of the pinion and the ring gear.

14. The engine starting apparatus of claim 13, wherein the depth is smaller than 1/n of the module, and wherein n is a positive integer of 9 or less.

15. The engine starting apparatus of claim 12, wherein
the motor is a brush type of DC motor having an armature, a rectifier arranged at the armature, a brush made in contact with a surface of the rectifier, and a spring pushing the brush to the surface of the rectifier, and
the armature has a torque larger than the idling torque of the one-way clutch.

16. The engine starting apparatus of claim 15, further comprising a reduction device which reduces a rotational speed of the motor and transmits the reduced rotational speed of the motor to the output shaft.

17. The engine starting apparatus of claim 16, wherein the control means includes delay means that allows the current switching means to start to operate when a predetermined period of time has passed since a start of a pushing operation of the pinion.

18. The engine starting apparatus of claim 11, wherein
the motor is a brush type of DC motor having an armature, a rectifier arranged at the armature, a brush made in contact with a surface of the rectifier, and a spring pushing the brush to the surface of the rectifier, and
the armature has a torque larger than the idling torque of the one-way clutch.

19. The engine starting apparatus of claim 18, further comprising a reduction device which reduces a rotational speed of the motor and transmits the reduced rotational speed of the motor to the output shaft.

20. The engine starting apparatus of claim 1, wherein the control means includes delay means that allows the current switching means to start to operate when a predetermined period of time has passed since a start of a pushing operation of the pinion.

* * * * *